United States Patent [19]

Hageman

[11] 3,963,205

[45] June 15, 1976

[54] PIPE SUPPORT SYSTEMS

[76] Inventor: Drew W. Hageman, P.O. Box 224, Stn. "Q", Toronto, Canada

[22] Filed: Apr. 4, 1974

[21] Appl. No.: 457,857

[52] U.S. Cl. .................................................. 248/55
[51] Int. Cl.² ............................................ F16L 3/16
[58] Field of Search ............. 248/49, 54 R, 55, 176, 248/309, 346

[56] References Cited

UNITED STATES PATENTS

| | | | |
|---|---|---|---|
| 1,963,242 | 6/1954 | Nelson | 248/346 X |
| 2,021,370 | 11/1935 | Mallay | 248/54 R |
| 2,561,540 | 7/1951 | Sherbrooke | 248/49 |
| 2,626,456 | 1/1953 | Harrison | 248/346 |
| 2,699,601 | 1/1955 | Darnell | 248/49 X |
| 2,885,462 | 5/1959 | Sylvester | 248/49 X |
| 3,298,644 | 1/1967 | Sherburne | 248/55 |
| 3,390,854 | 7/1968 | Sherburne | 248/55 |
| 3,771,751 | 11/1973 | Derivaz | 248/49 |

FOREIGN PATENTS OR APPLICATIONS

| | | | |
|---|---|---|---|
| 672,530 | 10/1963 | Canada | 248/55 |
| 414,789 | 12/1966 | Switzerland | 248/55 |

*Primary Examiner*—William H. Schultz

[57] ABSTRACT

A pipe support comprises a pipe shoe, an upper stainless steel bearing member curved upwardly at opposed edges to provide vertical stainless steel returns, and a lower bearing member having a bearing surface of low-friction material surmounting a layer of elastomeric material. The pipe shoe is advantageously of U-shape, W-shape or inverted Tee-shape and has a serrated or toothed upper periphery capable of being tailored prior to use by removal of the tips of the teeth to suit the specific geometry of pipe diameter and desired bottom-of-pipe to top-of-steel dimensions. A method of manufacturing U-shaped and inverted Tee-shaped serrated or toothed shoes in pairs is also provided, which involves cutting a rectangular tube longitudinally along two opposite sides or cutting a structural steel I- or H-section longitudinally thereof with a zigzag line of cut, whereby to form two similar serrated-edged halves.

8 Claims, 7 Drawing Figures

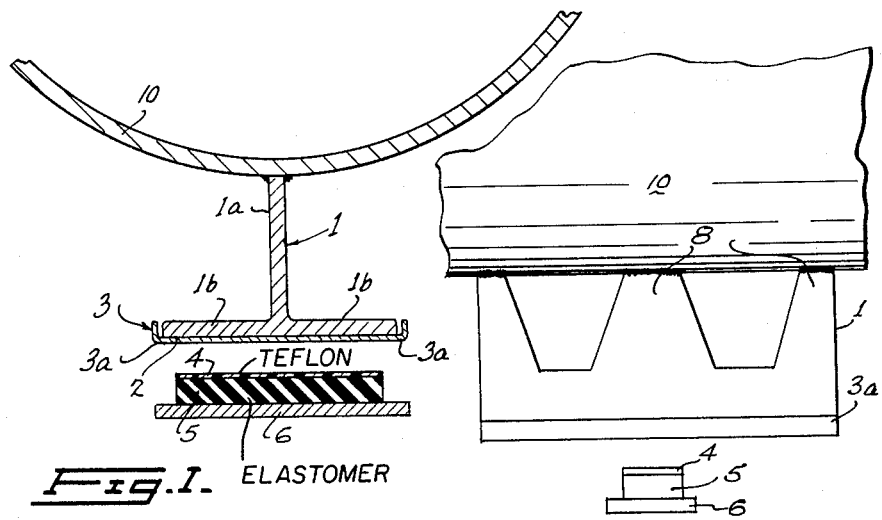
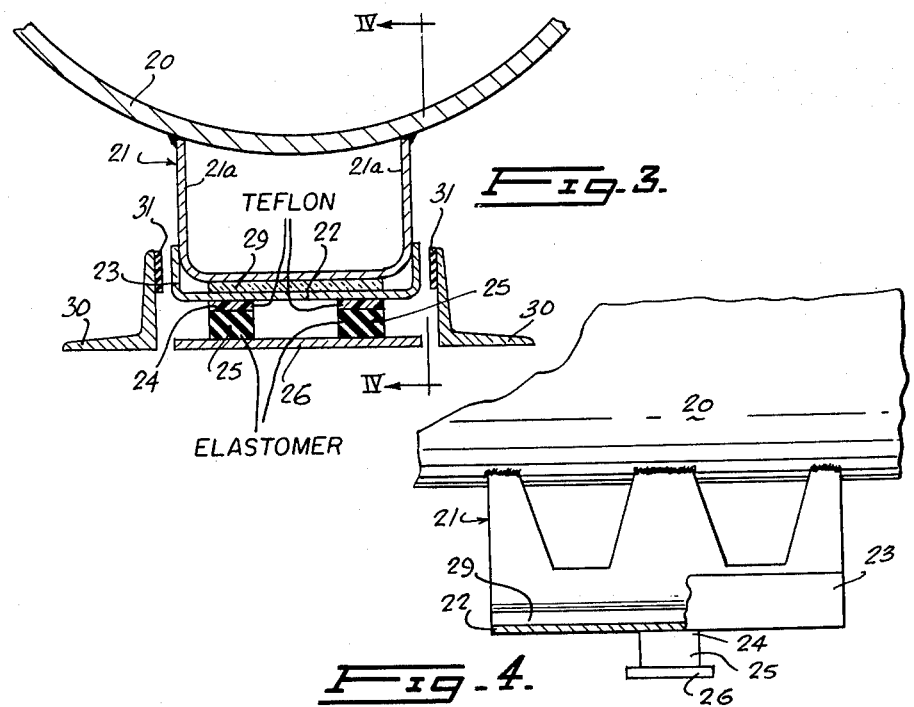

PIPE SUPPORT SYSTEMS

This invention relates to support systems for long structural members such as beams or pipes which may be subject during use to axial or lateral movements, or combinations thereof.

Industrial installations such as power plants and chemical plants generally contain large amounts of exterior and interior piping or other supported structures, in which some components are periodically subjected to forces due to thermal expansion, or movement of connected equipment that require the possibility of axial and/or lateral movement of such components in order to prevent the excessive build up of stress. To facilitate such movements, it has been the practice to utilize support devices for the pipes or the like which seek to reduce the friction between the pipe and its support. Hitherto the support of horizontal piping has been accomplished in a wide variety of ways, including pipe-support directly on sleepers, pipe-support on chairs made of structural Tees, structural channels, H-beams and welded assemblies; rollers for example made of cast iron, with and without pipe insulation protection saddles; restraining U-bolts and various other pipe protection shields and devices. Naturally, pipe supports must also be sufficiently strong to support the large loads of the metal pipes and their contents.

In cases in which piping in horizontal runs has been liable to expansion or other movement as a result of external or internal temperature change or movement of connecting equipment, the resulting movement of the pipe with respect to its support points has been accommodated in various ways. In some cases, merely steel-on-steel movements are facilitated. If rollers are used, longitudinal expansion of the piping produces a rotating effect. In some rollers merely a cored hole in a cast roller with a plain carbon steel axle is provided. In other rollers, special bearings and machined axle surfaces are used. Where the movement is principally a sliding movement, heavy duty molybdenum base lubricants have been utilized, as well as special bronze and graphite trepanned bearings, solid blocks of graphite, and pure and fiber reinforced polytetrafluoroethylene (PTFE) surfaces.

U.S. Pat. No. 3,390,854 (Phillip C. Sherburne) issued July 2, 1968, describes slidable supports for long structural members such as beams or pipes subject to movement, and discloses the use of a reinforced PTFE coated flat cylindrical member confined between two slide members to permit longitudinal, transverse and angular motion in a single plane at a supported portion of a structural member. However, the arrangement disclosed by Sherburne is relatively complicated and might also be somewhat unstable due to the fact that contact between the upper and lower bearing surfaces occurs only through the intermediary of the separate PTFE coated cylindrical member.

U.S. Pat. No. 3,484,882 (Robert J. Blanchette) issued Dec. 23, 1969 described a structural bearing assembly involving the use of upper and lower bearing members having slidably engaging pads of low friction material such as PTFE. An under layer of resilient material is interposed below the low friction layer on one of the pad assemblies, so as to absorb rotation of the beam. Similarly, U.S. Pat. No. 3,343,236 (John M. Graham) issued Mar. 29, 1966 discloses an arrangement including an upper pad comprising an elastomeric body covered with an anti-friction sliding surface member and a lower pad having a similar structure. However, each of these prior arrangements is not wholly satisfactory from the aspects of ability to support heavy loads and freedom of both transverse and longitudinal movement, as well as ease and cheapness of manufacture and installation.

Canadian Pat. No. 758,907 (Union Carbide Corporation) issued May 16, 1967 relates to corrosionless sliding supports for pipes and the like, including a first plate member in contiguous contact with a supported pipe and in sliding contact with a second plate member formed of a low-friction composition, such as carbon, a fibrous composition or a thermosetting or thermoplastic resinous composition, or a mixture thereof. Thus, the Union Carbide disclosure pertains to a two-piece support comprising a first plate member which is in direct contact with the pipe and is homogenous in that it includes the bearing surface and a second plate member which again is homogenous and contains a bearing surface as well as a surface in contact with a structural base support member. This design suffers from various limitations rendering subject to the disadvantages of the prior art as discussed above. Additionally, the Union Carbide design does not lend itself to field installation where the invert, i.e. bottom-of-pipe to top-of-steel dimension, varies. Moreover, a single device of that type can not be used with different pipe diameters.

It is an object of the present invention to provide a pipe support system capable of use with a variety of different loads and pipe sizes, which permits both free axial and lateral movement of the pipe or controlled movements of the pipe with respect to a base support, and which can be manufactured and installed with economy of material and labor.

It is a further object of the invention, to provide a pipe support which can be tailored to suit a specific geometry of pipe diameter and invert.

Accordingly, one aspect of the invention provides a support for a pipe, beam or other elongate structure, comprising a pipe shoe, a stainless steel upper bearing member connected to the pipe shoe and curving upwardly around two opposite sides of the shoe so as to provide vertical stainless steel-surfaced returns, and a lower bearing member having a low-friction bearing surface, for example a polytetrafluoroethylene (PTFE) bearing surface, surmounting a layer of elastomeric material.

If desired, depending on the pipe contents temperature anticipated during use, a layer of insulating material can be disposed between the pipe shoe and the stainless steel bearing surface of the upper bearing member, whereby the elastomeric layer of the lower bearing member will be insulated from undue heat conduction through the pipe shoe with respect to excessive high temperatures occurring when the pipe carries hot material.

In one embodiment, the pipe shoe is of inverted Tee configuration, with the stem of the Tee being weldable or otherwise securable to the underside of a pipe or other member to be supported. In a preferred embodiment, the pipe shoe is of U-shaped cross-section, with the pipe being cradled between the two sides of the U-shaped shoe, so as to afford a very stable arrangement. In another embodiment, for use with very wide pipes, the shoe is W-shaped with the height of the middle stem of the W being less than the height of the sides thereof.

According to another aspect of the invention, there is provided a pipe shoe suitable for use in pipe supports of the above defined type or in other pipe support applications, the shoe having a U-, H-, Tee- or W-shaped cross-section, the upper periphery or peripheries of which are serrated or toothed. As a result, the shoe is capable of being tailored by the removal of a portion of the tips of the teeth to suit the specific geometry of pipe diameter and/or the desired pipe-bottom to top-of-steel dimension, i.e. invert. Individual tailoring of the shoes can naturally be utilized when the pipe or the ground is not of uniform height and, in addition, this feature facilitates installation of the pipe supports in the field. The serrated or toothed form has the further specific advantage of reducing thermal stress concentrations in the pipe wall when attachment of the shoe to the pipe or tube is by welding.

An advantageous method of manufacturing U-shaped toothed or serrated shoes of the above-defined type comprises effecting a longitudinal cut down each side of a tube of rectangular cross-section, the cut being configured in a zigzag or undulating direction, whereby on separation of the two cut halves of the tube a pair of similar U-shaped serrated or toothed tube halves are obtained which can be converted into shoes by slicing into suitable lengths. Similarly, Tee-shaped pipe shoes can be manufactured by effecting an undulating cut down the middle portion of an I- or H-beam. This further results in an economy of materials as the effective height of the half shoe is increased by the amount of rise in the serration above the centre line of the original section. Thus an 8 inches deep section gives two shoes with the effective height of 5½ inches each, as compared with a 4 inches height made by a straight cutting of the section. This is of importance on rectangular tubing as well as "I" members being cut into Tee section.

As mentioned above, in the pipe support systems of the invention, the upper bearing member is normally formed of smooth, corrosion resistant stainless steel, for example that conforming to ASTM type 304 with a surface finish of less than 20 micro inches RMS (No. 10 mirror finish). This stainless steel bearing surface may be readily formed as a channel, for example on a press brake, giving a smooth radius formed with an inside radius preferably approximately equal to the thickness of the material used. The returns at either side of the channel are important in that they afford a vertical bearing surface when used in conjunction with guides so as to restrict movement of a pipe solely to one degree of freedom (normally axial movement), if this should be desired, and furthermore provide a smooth radius edge which will not damage the lower bearing member in applications where combined laterial and axial movements require the use of a partially exposed lower bearing member.

The stainless steel bearing surface is preferably somewhat longer than the associated pipe shoe and has an inside dimension slightly wider than the pipe shoe. This permits attachment of the stainless steel bearing surface to the pipe shoe by a down-hand tack weld in the field and by welding and/or epoxy bonding in the shop. This down-hand weld procedure for field application is advantageous in that it prevents the possibility of weld spatter fouling the bearing surfaces during installation. In addition, on lengthy shoes, multiple tacks may be placed along the top edge of the channel legs or returns without damage or distortion of the actual bearing surface.

The bearing surface of the lower bearing member is preferably formed of pure unfilled virgin PTFE and may be readily made from pressure cast billets skived to the required thickness. PTFE is the preferred material of the bearing surface of the lower bearing member in order to take advantage of the special frictional characteristics of PTFE, which exhibits a coefficient of static friction lower than its coefficient of dynamic friction. Inasmuch as any movement of the pipe will be at a very low velocity, the coefficient of static friction of the bearing surface is the primary consideration. PTFE also exhibits a limited variation in coefficient of friction over a wide range of compressive stresses and, in fact, the coefficient decreases somewhat as the unit loading is increased.

The elastomeric layer below the bearing surface is principally present to ensure parallel bearing surfaces and hence uniform loading of the PTFE throughout the operation cycle of the bearing support. Misalignment of the bearing surfaces can result from a. deflection of the pipe from the disposition thereof when empty to the disposition during operation;
b. misalignment of the supporting steel structure with respect to the axis of the pipe;
c. movement of the supporting steel structure with respect to the axis of the pipe;
d. deflection of the supporting steel structure due to filling and emptying of the pipe itself or adjacent piping; or
e. rotational effects of the pipe induced by thermal or other expansion.

The elastomeric material is chosen depending on the anticipated operating conditions. Where temperature extremes are of principal concern, a urethane rubber may be utilized. This material is also satisfactory for high radiation areas. For general petroleum service application, a reinforced neoprene elastomer with a compressability factor of 7½ to 10 percent at 1,000 psi may be used with advantage. For steam distribution systems and central heating plant distribution systems, a natural rubber reinforced elastomer with a similar compressability factor is more economical.

The base plate of the lower bearing member to which the elastomeric layer is attached is advantageously made slightly wider on each side than the bearing pad, so as to afford a heat-sink to permit attachment to supporting structure by welding. Naturally, attachment by bolting may also be employed. The base plate may conveniently be formed of carbon steel, but stainless steel or galvanized carbon steel could be used to satisfy particular requirements.

The three components of the lower bearing member may conveniently be shop-bonded for example using high-strength epoxy adhesive, to form a single homogeneous assembly ready for installation. With the smaller bearings, an additional mechanical bond consisting of a counter-sunk rivit or pin may be used to afford further structural stability of the three-piece assembly.

The use in appliant's pipe supports of a stainless steel upper bearing surface connected to a pipe shoe obviates direct contact of the PTFE (which is sensitive to high temperatures) with the pipe. Additionally, the presence of the stainless steel upper bearing surface facilitates the introduction, where desired, of a high density insulation material between the pipe shoe and the steel bearing surface.

In a further feature of the invention, guide angles may be disposed on either side of the pipe support upper member, conveniently attached to the supporting structure of the lower bearing member, so as to afford a predetermined clearance between the vertical returns of the upper bearing member, whereby to restrict the movement of the piping to a predetermined travel, or, if desired, to one degree of freedom, usually true axial movement. The guides may also be utilized as couples to remove side moments resulting from changes in direction of the pipe, expansion loops and other considerations. The stainless steel bearing surface of the upper bearing member of the invention permits the use, if desired, of PTFE facing on the guide angles, giving low-friction guide surfaces. Thus, in this aspect of the invention, a preferred bearing situation of dissimilar material exists in all places, i.e. stainless steel on either carbon steel angles or PTFE faced angles and stainless steel on the PTFE surfaced lower bearing member.

For a better understanding of the invention reference will now be made by way of example to the accompanying drawings, in which:

FIG. 1 is a diagrammatic end sectional view of a pipe support assembly;

FIG. 2 is a diagrammatic side view of the assembly shown in FIG. 1;

FIG. 3 is an end sectional view of a modified pipe support assembly;

FIG. 4 is a side view of the assembly of FIG. 3, partly broken away and with portions omitted for clarity;

Figure 5:
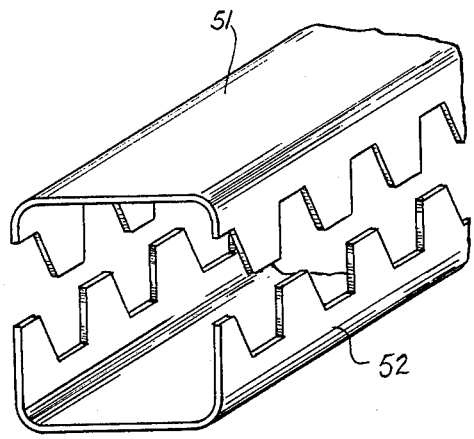
FIG. 5 is a perspective view showing a stage of manufacture of pipe shoes.

Referring first to FIGS. 1 and 2, the pipe support includes an upper bearing member comprising a pipe shoe 1 in the form of an inverted Tee. Stem 1a of the shoe 1 is welded to a pipe 10. The shoe 1 has attached to the lower surface thereof a stainless steel channel 2 having a return 3 on each side thereof, which returns extend upwardly to enclose the sides of the shoe 1. The outer, i.e. lower, surface of the stainless steel channel 2 including the outer surfaces of the returns 3 has smooth, low-friction surface. The lower surface of the channel 2 and the returns 3 are connected by smooth radii 3a.

The lower member of the pipe support comprises a flat Teflon (trademark for PTFE) bearing surface 4 supported by a pad 5 of elastomeric material which, in turn, is secured to a steel base plate 6. In use, the lower surface of the channel 2 of the upper bearing member contacts the bearing surface 4 of the lower bearing member, so as to support the pipe 10. The two members are shown spaced apart in FIG. 1 merely for clarity.

As can be seen from FIG. 2, the stem 1a of the shoe 1 is formed at the top with castellations or teeth 8. As a result of this structure, the pipe support can be tailored prior to use by cutting or burning off the tips of the teeth 8, so as to accommodate a desired bottom-of-pipe to top-of-support dimension for horizontal pipe.

Referring now to FIGS. 3 and 4, a further embodiment of pipe support is illustrated, comprising a U-shaped pipe shoe 21 welded along the top of each side 21a to the bottom of a pipe 20. Secured to the underside of the shoe 21 is a stainless steel channel 22 having smoothly curved corners and returns 23. Connection between the shoe 21 and the channel 22 occurs at the lines of contact of the returns 23 with the sides 21a of the shoe 21. Between the lower surface of the shoe 21 and the upper surface of the channel 22 is disposed a layer 29 of insulation material.

The lower bearing member comprises a pair of spaced bearing blocks, each constituting a Teflon layer 24 surmounting a pad 25 of elastomeric material. The pads 25 are both secured to a base plate 26.

The insulating layer 29 is for the purpose of avoiding possible damage to the Teflon layer 24 by heat transference through the shoe 21 when very hot material is being carried in the pipe 20. Layer 29 may be omitted when undue heat transference is not a problem.

At each side of the pipe support is disposed a series of longitudinally extending angles 30, each provided on the side facing the pipe support with a pad 31 of Teflon. The angles are appropriately laterally spaced, so as to afford a desired limited clearance between pads 31 and returns 23 of the channel 22, whereby to permit only a limited lateral movement of the supported pipe 20 by mutual contact of the low-friction surfaces of the pads 31 and returns 23. For an installation involving a plurality of pipe supports at spaced intervals beneath a pipe, the angles 30 can conveniently be provided alongside every second or third pipe support.

Instead of being welded to the underside of the pipe, the pipe supports can be secured by strapping, U-bolts and saddle, pipe clamps, or other conventional means. In the event of using strapping, slots are conveniently provided in the sides 21a of the shoe 21, and the strapping passes through the slots and around the pipe.

In any of the above embodiments, the shoe may be contoured to compensate for a line of pitch of a pipe, by cutting the tips of the teeth at the proper slope. Moreover, the tips of the teeth may be individually tailored to accommodate pipe fittings such as elbows, tees, reducers, straps or clamps.

Figure 6:
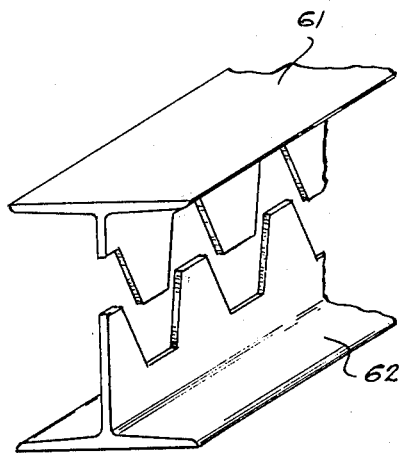
FIG. 6 is a perspective view showing a stage of manufacture of further pipe shoes.

Referring now to FIGS. 5 and 6, there are diagrammatically illustrated two types of pipe shoe stock obtained according to embodiments of a method of the invention for manufacturing pipe shoes. Thus, in the embodiment of FIG. 5, a rectangular steel tube is cut midway along each side for example by means of a flame cutter, in a zigzag or undulating pattern. On separation of the resultant cut halves, a pair of similar U-shaped portions 51 and 52 is obtained, each of which is suitable for use as stock for pipe shoes. Pipe shoes may be simply obtained therefrom by severing the stock into appropriate lengths. Such pipe shoes are then suitable for use in the production of pipe supports of the invention. These pipe shoes, without bearings, may be utilized as supports or anchors where movements or the resultant steel-on-steel friction forces are not of concern to the pipe and support application.

In FIG. 6, an alternative embodiment is illustrated, in which an I-beam is cut into two similar halves 61 and 62, each of which is suitable for use as stock for producing inverted Tee-shaped shoes for the embodiment of pipe support described with reference to FIGS. 1 and 2.

Figure 7:
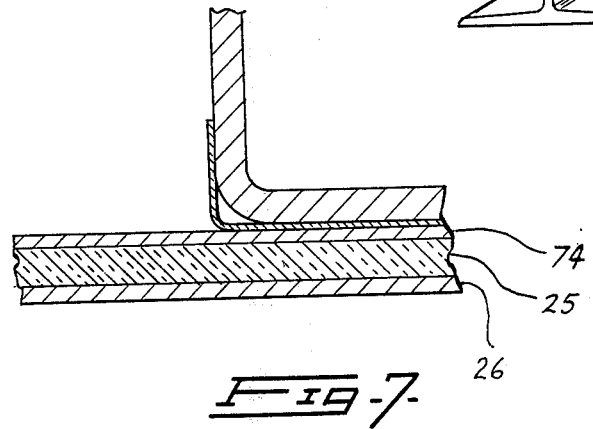
FIG. 7 is a fragmental end sectional view of another embodiment of pipe support.

FIG. 7 shows a modification of the embodiment of FIGS. 3 and 4, in which the pair of lower bearing members each comprising layer 24, pad 25 and base plate 26, are replaced by a single lower bearing member including PTFE layer 74, pad 75 and base plate 76 extending laterally of either side of the upper bearing member, whereby to permit a significant degree of lateral travel of the upper bearing member. By virtue of the curved corners of the channel 22, lateral travel can occur without damage to the lower bearing surface 74. In this embodiment, the thickness of the layer 74 of PTFE should be sufficient to permit absorption or embedding of normal dirt particles into the plastic surface without damaging the bearing surfaces or affecting the coefficient of friction of the combined bearing faces.

In a further embodiment of the invention, a pair of U-shaped pipe shoes are secured together along their mutually facing sides, so as to form a W-shape. The interior composite wall is arranged to be somewhat shorter than the outer sides, so as to support the curved surface of a pipe along all three stems of the W-shaped shoe. The desired uneven U-shaped member for use in forming the W-shaped shoe can conveniently be obtained by cutting a rectangular tube along each side in the undulating or zigzag pattern as described above, but arranging the nominal centre lines of the cut line slightly below the centre line of the respective side of the rectangular tube and the opposite cut line the same amount above the centre line of the tube.

The embodiments of the invention in which an exclusive property or privelege is claimed are defined as follows:

1. A pipe support comprising
   a. a pipe shoe for connection to a pipe;
   b. an upper bearing member connected to the pipe shoe to support the same, said member having a horizontal portion that curves upwardly at a pair of opposite edges into a pair of upwardly extending returns, said horizontal portion having a downwardly facing, flat, smooth, horizontal bearing surface fixedly secured thereto; and
   c. a lower bearing member beneath the upper bearing member having an upwardly facing, low-friction bearing surface secured to and surmounting a layer of elastomeric material that in turn is secured to and surmounts a base plate for mounting the lower bearing member in a fixed location;
   d. said bearing surfaces directly engaging each other in free sliding relationship in any direction in a horizontal plane defined by said surfaces.

2. A pipe support comprising
   a. a pipe shoe for connection to a pipe;
   b. an upper bearing member connected to the pipe shoe to support the same, said member having a horizontal portion that curves upwardly at a pair of opposite edges into a pair of upwardly extending returns, said horizontal portion having a downwardly facing, flat, smooth, horizontal bearing surface fixedly secured thereto;
   c. a lower bearing member beneath the upper bearing member having an upwardly facing, low-friction bearing surface secured to and surmounting a layer of elastomeric material that in turn is secured to and surmounts a base plate for mounting the lower bearing member in a fixed location;
   d. said bearing surfaces directly engaging each other in free sliding relationship in any direction in a horizontal plane defined by said surfaces; and
   e. a guide member disposed on each side of the lower bearing member and positioned laterally of each said return of the upper bearing member at predetermined locations whereby to limit transverse movement of the upper bearing member.

3. A pipe support according to claim 1, wherein said pipe shoe comprises a member having at least one upwardly projecting, plate-like portion having an upper periphery, each said periphery being of toothed configuration whereby to permit removal of the tips of the teeth to tailor the shoe to provide a desired invert when secured to a pipe.

4. A pipe support according to claim 1, wherein the pipe shoe is of inverted Tee-shape in cross-section.

5. A pipe support according to claim 1, wherein the lower bearing surface is formed of PTFE.

6. A pipe support according to claim 1, wherein a layer of insulating material is disposed between the pipe shoe and the upper bearing member.

7. A pipe support according to claim 2, wherein the guide members are faced with PTFE.

8. A pipe support according to claim 14 comprising a pipe shoe stem having an upper edge or edges of serrated or toothed configuration.

* * * * *